United States Patent
Ohlin et al.

[15] 3,663,823
[45] May 16, 1972

[54] METHOD AND APPARATUS FOR PHOTOMETRIC ANALYSIS

[72] Inventors: Lars Erik Ohlin, Stocksund; Jan Olof Lofvenmark, Huddinge, both of Sweden

[73] Assignee: Linson Instrument Aktiebolag, Stockholm, Sweden

[22] Filed: Dec. 16, 1968

[21] Appl. No.: 783,822

[30] Foreign Application Priority Data

Dec. 18, 1967  Sweden..............................17342/67

[52] U.S. Cl.............................................250/218, 356/208
[51] Int. Cl. ......................................................G01n 21/26
[58] Field of Search .................200/218; 356/185, 195, 205, 356/179, 201, 208

[56] References Cited

UNITED STATES PATENTS

| | | | |
|---|---|---|---|
| 3,437,822 | 4/1969 | Fitzsimmons | 250/218 |
| 3,428,401 | 2/1969 | Buzza | 356/81 |
| 3,441,349 | 4/1969 | Daly et al | 356/179 |
| 3,487,225 | 12/1969 | Button | 356/205 |
| 2,467,844 | 4/1949 | Michel | 356/205 |
| 2,722,156 | 11/1955 | Warren | 250/218 |
| 2,960,910 | 11/1960 | Pelavin | 250/218 |

OTHER PUBLICATIONS

" Automatische Spektral Fotometer" – m UV– and sichtbaren Spektralbereichill by Ver Fasjer, July, 1955.

*Primary Examiner*—Walter Stolwein
*Attorney*—Hill, Sherman, Meroni, Gross & Simpson

[57] ABSTRACT

A method and an apparatus for sequentially testing a series of samples in respect of the absorbency or another optical characteristic by means of a single-beam photometric system. The photometric system has a sample cell which is displaceable between a first position, in which it is in the path of light between the light source and the light-sensitive detector of the photometric system, and a second position, in which it is clear of the path of light. Immediately prior to each test a reference signal is generated with the sample cell in the second position and using the air in the path of light as a reference sample. This reference signal is stored by means of a capacitor and when the actual sample is tested with the sample cell in the first position, the stored reference signal is retrieved and compared with the signal obtained on the test. Before the testing of the series of samples is commenced the photometric system is calibrated by means of a blank sample to give equal signals for the blank sample and the air used as a reference sample.

3 Claims, 4 Drawing Figures

Patented May 16, 1972
3,663,823
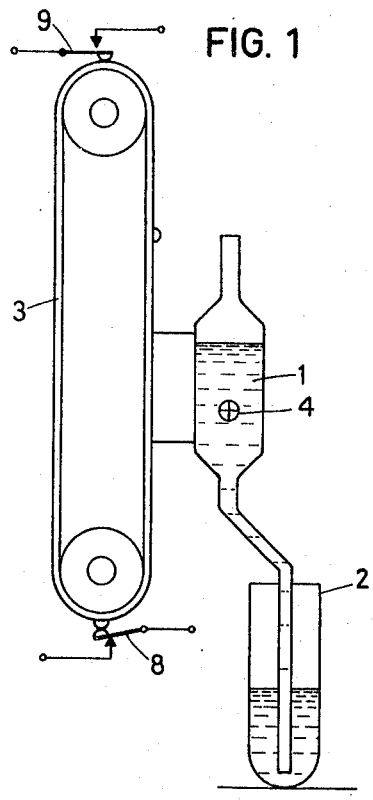
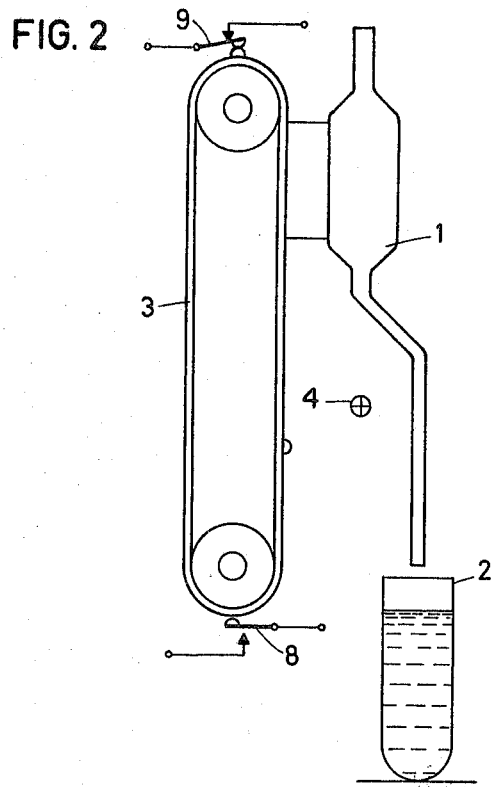
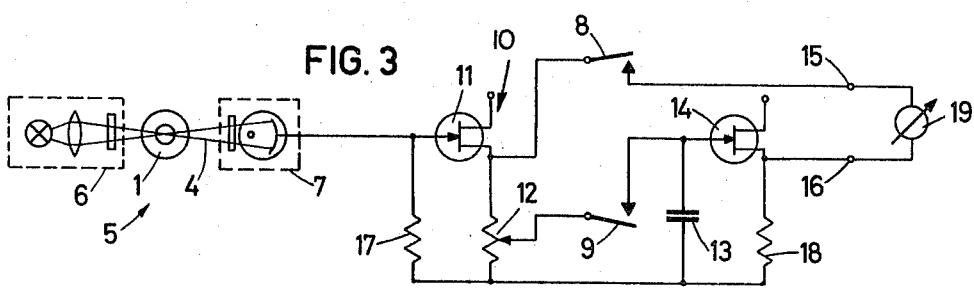
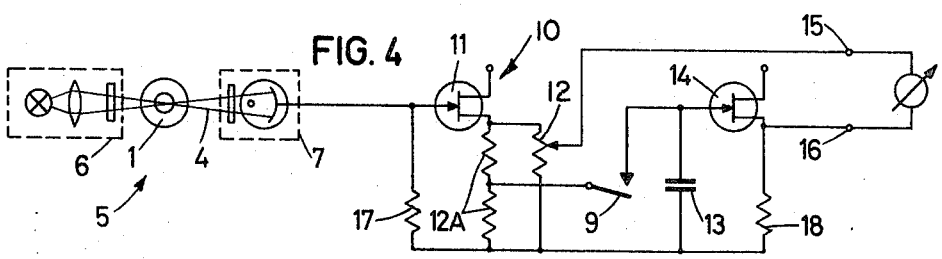
INVENTORS
LARS ERIK ÖHLIN
JAN OLOF LÖFVENMARK
BY
ATTORNEYS

METHOD AND APPARATUS FOR PHOTOMETRIC ANALYSIS

This invention relates to photometric analysis, and more particularly to sequential photometric analysis of a series of samples.

As is well known, photometric analysis comprises the measurement of an optical characteristic, such as the absorbency, fluorescence or turbidity (nephelometry), of a sample. The sample is illuminated by a beam of light, and the intensity of the light transmitted through the sample or otherwise leaving the sample as a result of the illumination, is measured by means of a light-sensitive detector and translated into an electric signal the strength of which is a measure of the optical characteristic.

In photometric analysis it is common to carry out the measurement of the optical characteristic as a differential measurement, which means that the sought value of the optical characteristic is determined on the basis of the difference between the strength of the electric signal obtained with the actual sample, as mentioned above, and the strength of an electric reference signal obtained in the same manner with a reference or a blank sample.

It is well known to generate the sample and reference signal simultaneously in a double-beam photometric system having a common light source and two light-sensitive detectors, one beam and one detector being employed for a blank sample and the other being employed for the actual samples. In this way, any changes of the characteristics of the light source which may occur during the analysis of a series of samples affect the sample and reference signals alike, whereby the effects of the changes on the signals balance or cancel each other. This system is, however, disadvantageous in certain respects.

It is also known, before commencing the analysis of a series of samples in a single-beam photometric system, to generate a reference signal using a reference sample and store this signal on a magnetic recording tape. This signal is then sensed each time an actual sample is analyzed and compared with the signal obtained with the sample. As will be understood, this method of measurement does not provide for compensation or cancelation of the effects of any changes of the characteristics of the photometric system, caused by thermal drift, for instance.

Accordingly it is a general object of the invention to provide an improved method and an improved apparatus for sequentially measuring an optical characteristic of a series of samples by means of a single-beam photometric system and wherein for each sample being measured, a new reference signal is generated and compared with a signal obtained with the sample.

A more specific object of the invention is to provide a method and an apparatus in accordance with the foregoing general object wherein immediately prior to the measurement on each sample a reference signal is generated and stored and this reference signal is then retrieved and compared with the signal obtained on the measurement on the sample.

The above and other objects, features and advantages of the invention will be more fully understood from the following description considered in connection with the accompanying drawing, in which:

FIGS. 1 and 2 are similar diagrammatic elevational views of a vertically movable sample cell, FIG. 1 showing the sample cell in a first or lower position in the beam of light of a photometric system and FIG. 2 showing the sample cell in a second or upper position clear of the beam of light, FIGS. 3 and 4 are schematic diagrams of the photometric system and associated circuitry, illustrating alternative embodiments of the latter.

While only certain preferred forms of the invention have been shown, it should be understood that various changes or modifications may be made within the scope of the appended claims without departing from the underlying idea or principles of the invention.

Referring to the drawings in detail, FIGS. 1 and 2 show an aspiration sample cell 1, the upper end of which is connected to a suction source not shown. Each sample to be analyzed is aspirated into the sample cell 1 from a test tube 2. The sample cell 1 is vertically movable between a first or lower position (FIG. 1) and a second or upper position (FIG. 2) by means of a suitable mechanism 3, such as a reciprocating belt or chain drive. In the lower position, the sample cell 1 is in the light beam 4 of the photometric system 5; in FIGS. 1 and 2, the light beam is marked by a cross in a circle to denote a fixed location and intensify and assumed to extend perpendicularly to the plane of the figures (see also FIGS. 3 and 4). In the upper position, the sample cell is clear of the light beam 4 so that the light can pass from the light source 6 to the photodetector 7 (the light source and the photodetector are assumed to include the required filters, light gates, lenses and the like) of the photometric system (see FIGS. 3 and 4) without being obstructed by the sample cell; to this end the lower portion of the latter is laterally offset, as shown in FIGS. 1 and 2.

When the sample cell 1 is moved to the lower position, the mechanism 3 closes a normally open switch 8, and when the sample cell is moved to the upper position, the mechanism closes a normally open switch 9. The function of the two switches 8 and 9 is explained in more detail below.

As seen from FIG. 3, the photodetector 7 is connected to a power amplifier 10 having a field-effect transistor 11 as active member. A potentiometer 12 is connected in the source circuit of the transistor 11, and the movable terminal of the potentiometer is connected to one side of the normally open switch 9. The other side of the latter is connected to a storage capacitor 13 and the gate electrode of a field-effect transistor 14 serving as a discharge resistor for the storage capacitor.

That fixed terminal of the potentiometer 12 which is connected to the field-effect transistor 11 is connected, through the normally open switch 8, to one terminal 15 of two output terminals 15 and 16. The other fixed terminal of the potentiometer 12 is directly connected to a bias resistor 17 of the amplifier 10, one side of the capacitor 13, and one side of a resistor 18 in the source circuit of the field-effect transistor 14. The second one 16 of the two output terminals 15 and 16 is connected directly to the joint between the other side of the resistor 18 and the source electrode of the field-effect transistor 14. Between the output terminals 15 and 16 there is connected a read-out instrument 19, which may be any suitable instrument, such as a direct-reading voltmeter, a digital printer or the like, which indicates in the desired form (in terms of absorbence or concentration, for instance) the voltage between the output terminals.

The procedure for the analysis of a series of samples will now be described with reference to FIG. 1 to 3. Before the analysis of the first sample, the sample cell 1 is filled with a blank sample which may be pure water or another suitable substance. For obtaining a reference value of the absorbency (or another optical characteristic, depending on the type of analysis) the sample cell 1 is then moved to the lower position so that the switch 8 is closed (FIG. 1). Depending on the intensity of the light transmitted through the sample cell 1 and the blank sample therein, and thus the intensity of the light falling on the photodetector 7, a weaker or stronger current will flow through the source circuit of the field-effect transistor 11. Consequently, a voltage proportional to the absorbency of the blank sample will be produced between the fixed terminals of the potentiometer 12. This voltage is applied as a reference voltage between the output terminals 15, 16 (any voltage over the resistor 18 may be neglected) and indicated by the read-out instrument 19. The reading of the instrument is noted, whereupon the sample cell 1 is moved to the upper position shown in FIG. 2 so that the light beam 4 can pass freely through the air between the light source 6 and the photodetector 7. In this position, the switch 8 is open, while the switch 9 is closed and consequently the storage capacitor 13 is charged to the voltage between the lower fixed terminal and the movable terminal of the potentiometer 12. This voltage is adjusted by displacing the movable terminal of the potentiometer until the read-out instrument 19 indicates the previously noted value (the reference voltage). The above described calibration procedure is repeated, if necessary, until the readings are equal for the blank sample and the air for one and the same settings of the potentiometer.

After the calibration procedure, which thus involves replacing the blank sample in the sample cell 1 by an equivalent reference sample consisting of the air between the light source 6 and the photodetector 7, the analysis of the series of samples can begin. When the first sample is to be analyzed, the sample cell is first moved to the upper position to allow the light beam 4 to pass freely through the air and cause the capacitor 13 to be charged. The output terminal 16 is accordingly placed at a potential which is slightly less than the potential of the movable terminal of the potentiometer 12, and thus the potential of the upper side of the capacitor 13, but the difference may be neglected. When the switch 9 is opened, the capacitor 13 maintains the output terminal 16 at that potential.

The sample cell is then moved to the lower position to cause the light beam 4 to pass through the sample and cause another voltage to be produced over the potentiometer 12 and applied between the output terminals 15 and 16 (sample voltage). Now there are two voltages applied over the output terminals, namely the sample voltage and the reference voltage, and as these two voltages are in opposition, the read-out instrument will indicate the difference between them.

Before the next sample is analyzed, the storage capacitor 13 is again charged so as to apply between the output terminals 15 and 16 a new reference voltage which is compensated for any drift of the photometric system which has arisen after the calibration. As such a drift affects the reference and sample voltages alike, its effect is balanced for each sample.

Owing to the extremely high input resistance of the field-effect transistor 14, the discharge time constant of the storage capacitor 13 is sufficient to ensure that the voltage drop over the capacitor occurring between the charging thereof and the subsequent analysis of a sample is neglectable.

The embodiment shown in FIG. 4 differs from that shown in FIG. 3 only in that the switch 8 is omitted and in that the movable terminal of the potentiometer 12 is connected to the output terminal 15 instead of being connected to the switch 9. The switch 9 is connected to the joint between two fixed resistors 12A, which are connected in the source circuit of the field-effect transistor 11 in parallel with the potentiometer 12.

The analysis procedure with this embodiment is substantially the same as that with the embodiment shown in FIG. 3, but the calibration procedure is reversed. Thus, the first calibration step comprises measurement through the air with the sample cell moved to the upper position and the switch 9 closed so that a non-variable reference voltage is applied and maintained over the capacitor 13 and between the output terminals 15 and 16. The sample cell with the blank sample is then moved to the lower position so that the switch 9 is opened and a second voltage is applied between the output terminals in opposition to the reference voltage. The movable terminal of the potentiometer 12 is adjusted until the second voltage cancels the reference voltage, and the analysis of the samples may then be commenced. With this embodiment there is no need for repeating the calibration steps, since a change of the setting of the potentiometer 12 does not affect the reference voltage.

What is claimed is:

1. A method of sequential photometric analysis of a series of samples on the basis of the difference in a selected optical characteristic of each sample and a reference, said method comprising for each sample to be analyzed the steps of:

a. introducing the sample into a light transmitting sample cell;
b. displacing the sample cell between a position in which the cell and the sample in it are in the fixed path of a steady beam of light extending from a light source to a light detector of a single beam photometric system, and a position in which the beam is unobstructed by any cell and sample;
c. producing by means of the light beam and light detector a first electric signal of a magnitude proportional to the illumination of the detector when the sample cell is in one of said positions;
d. storing the first signal;
e. subsequently producing by the same means as those producing as the first signal a second electric signal of a magnitude proportional to the illumination of the detector when the sample cell is in the other of said positions; and
f. comparing the second signal with the stored first signal, and detecting the difference in the magnitudes of the signals.

2. An apparatus for sequential photometric analysis of a series of translucent samples on the basis of the difference in a selected optical characteristic of each sample and a reference, said apparatus comprising:

a. a single beam photometric system having a light source for passing a steady beam of light to a single light detector along a fixed path;
b. a light transmitting sample cell;
c. means for moving said sample cell once for each sample between a position in which it is in said path and a position in which said path is unobstructed;
d. means in said photometric system for generating a first electric signal of a magnitude proportional to the illumination of said light detector when said sample cell is in one of said positions, and the last mentioned means producing a second electric signal of a magnitude proportional to the illumination of said light detector when said sample cell is in the other of said positions;
e. storage means for storing said first signal; and
f. means for comparing said second signal with said stored first signal, and for detecting the difference in the magnitudes of said signals.

3. An apparatus for sequential photometric analysis of a series of translucent samples, comprising:

a. a single beam photometric system having a light source for emitting a steady beam of light along a predetermined path;
b. a light transmitting sample cell;
c. means for moving said sample cell between a first position in said path and a second position in which said path is unobstructed once for each sample to be analyzed;
d. light measuring means including
  1. a light sensitive detector and
  2. means for generating a first electric signal of a magnitude proportional to the illumination of said detector when said sample cell is in said first position and the last mentioned means generating a second electric signal of a magnitude proportional to the illumination of said detector when said sample cell is in said second position;
e. capacitor means for storing one of said first and second signals; and
f. means for simultaneously sensing the stored signal and the other one of said first and second signals and indicating the difference between them.

* * * * *